Figure 1:
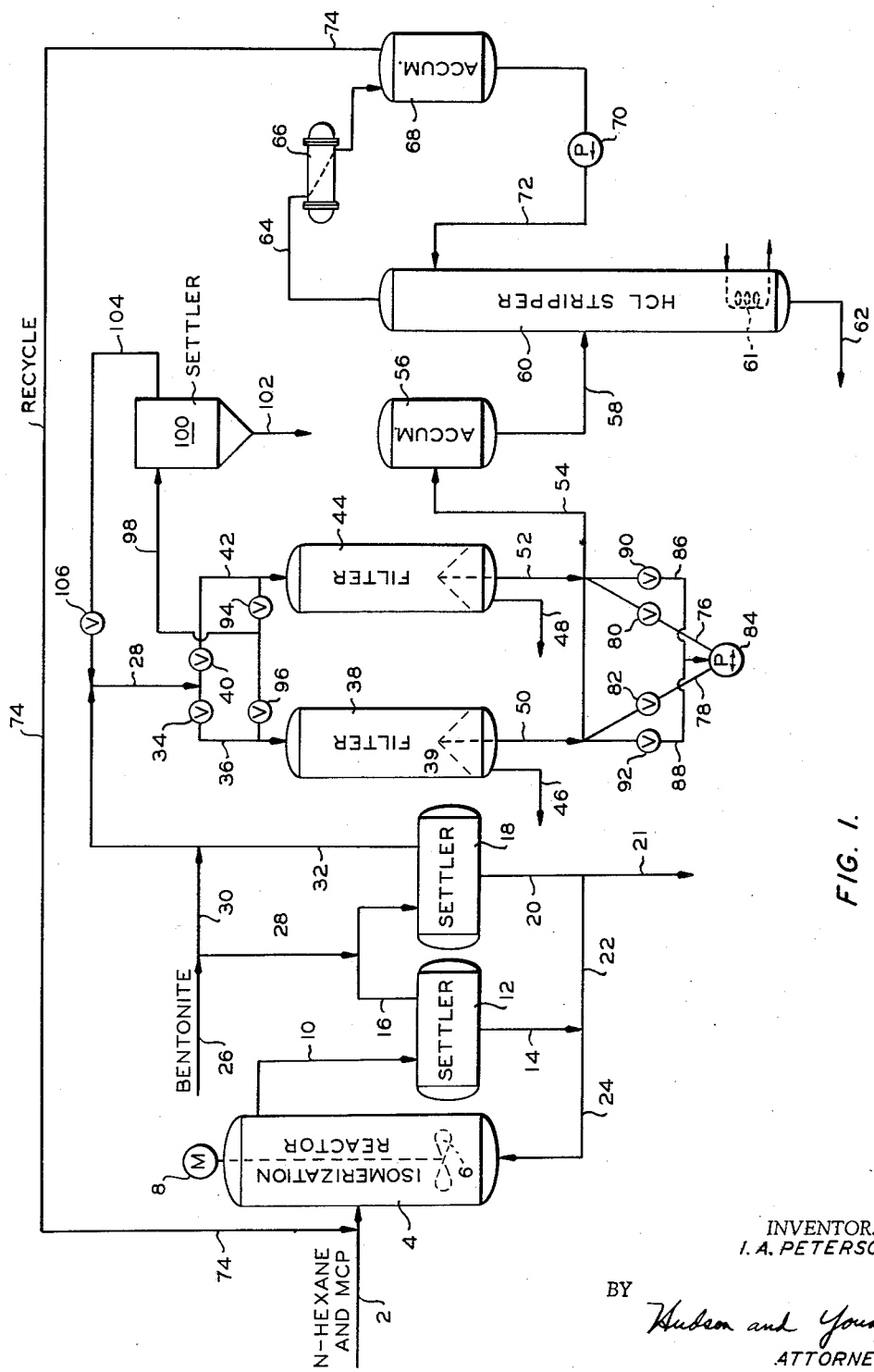

Sept. 13, 1960

I. A. PETERSON 2,952,720

CATALYST RECOVERY

Filed April 22, 1957

2 Sheets-Sheet 1

FIG. I.

INVENTOR.
I. A. PETERSON

BY Hudson and Young
ATTORNEYS

Sept. 13, 1960

I. A. PETERSON 2,952,720

CATALYST RECOVERY

Filed April 22, 1957

2 Sheets-Sheet 2

INVENTOR.
I. A. PETERSON

BY Hudson and Young

ATTORNEYS

United States Patent Office 2,952,720
Patented Sept. 13, 1960

2,952,720
CATALYST RECOVERY

Ivan A. Peterson, Bartlesville, Okla., assignor to Phillips Petroleum Company, a corporation of Delaware Filed Apr. 22, 1957, Ser. No. 654,338

5 Claims. (Cl. 260—683.41)

This invention relates to an improved process for the conversion of hydrocarbons in the presence of a metal halide catalyst. In one aspect, it relates to an improved process for separating a metal halide-hydrocarbon complex catalyst, such as aluminum chloride complex, from a reaction effluent.

Many reactions involving hydrocarbons are carried out in the presence of a metal halide catalyst. In these reactions the metal halide is often carried from the reaction zone in the effluent hydrocarbon stream. Removal of the entrained catalyst, which frequently forms a complex sludge-like material with hydrocarbons present in the reaction zone, is usually accomplished by settling and decantation. This operation can be carried out in more than one zone, said settling zones usually being arranged in series. Following the settling treatment the hydrocarbon phase of the reaction effluent is often scrubbed with a basic material, such as caustic, to remove hydrogen halide and then passed through a filter, containing an inert material such as sand, coal, etc. wherein any remaining metal halide is removed from the hydrocarbons.

It is apparent, from the foregoing, that the conventional method for separating catalyst from the hydrocarbon product is quite complicated.

It is an object of this invention to provide an improved process for the conversion of hydrocarbons with metal halide catalysts.

Another object of this invention is to provide an improved process for the recovery of a metal halide catalyst from a hydrocarbon reaction effluent.

Still another object of this invention is to provide an improved process for the separation of aluminum chloride-hydrocarbon complex catalyst from a hydrocarbon reaction effluent.

These and other objects of the invention will become more readily apparent from the following detailed description and discussion.

The foregoing objects are achieved broadly by contacting effluent from the catalytic conversion of a hydrocarbon in the presence of a metal halide-hydrocarbon complex catalyst with a material selected from the group consisting of bentonite, alkyl, alkenyl and alkadienyl amines and alkylene, alkenylene and alkadienylene diamines, whereby the catalyst coagulates, and separating the coagulated catalyst.

In one aspect of the invention the reaction effluent is passed through at least one settler to remove the major part of the reaction product before the catalyst is coagulated.

This invention is applicable in general in the catalytic treatment of hydrocarbons with metal halide-hydrocarbon complex catalysts. Processes which are included within the scope of the invention include the isomerization of normal paraffins, such as normal butane, normal pentane, normal hexane, etc. to isomers thereof; isomerization of methylcyclopentane to cyclohexane; condensation reactions, such as the alkylation of isobutane with ethylene to form diisopropyl; alkylation of benzene with propylene to form cumene; polymerization of olefins, such as propylenes and butylenes to provide motor fuel, etc.

The catalysts employed in carrying out these reactions are the metal halide catalysts, such as, the halides of aluminum, beryllium, boron, zinc, titanium, tin, zirconium, iron, antimony, etc. Particularly useful catalysts are aluminum chloride, boron trifluoride, and aluminum bromide. These catalysts can be used as such, however, in many instances the halide forms a complex with hydrocarbons present in the reaction zone. The invention is especially applicable to the removal of fluid complexes of the type described.

The coagulants employed in recovering the catalyst include bentonite which is a member of the montmorillonite group having an approximate formula $Al_2O_3.4SiO_2.H_2O$. This material is highly thixotropic and highly adsorptive, and is of very small particle size, being scarcely visible under powerful microscopes. Also useful as coagulants are normal alkyl amines in which the alkyl group contains from 8 to 20 carbon atoms, secondary and tertiary amines in which the alkyl groups contain not more than 20 carbon atoms and at least one of the alkyl groups contains at least 8 carbon atoms and alkylene diamines in which the alkylene groups contain not more than 20 carbon atoms and at least one alkylene group contains at least 8 carbon atoms. Examples of specific amines which can be used are normal decylamine, di(normal decyl)amine, normal hexadecylamine, normal dodecylamine, normal tridecylamine, normal pentadecylamine, normal octadecylamine, etc., secondary decylamine, secondary dodecylamine, tertiary dodecylamine, 9-methyl-n-hexadecylamine, n-decyl-n-dodecylamine, 3-amino-propyloctadecylamine, two-amino-ethyldecylamine, etc. While the normal amines are preferred branch chain amines can also be used. In addition the coagulants include alkenyl and alkadienyl amines and alkenylene and alkadienylene diamines in which the alkenyl, alkadienyl, alkenylene and alkadienylene groups contain not more than 20 carbon atoms and at least one alkenyl, alkadienyl, alkenylene or alkadienylene group contains at least 8 carbon atoms. Examples of these amines are n-nondecenyl-9-amine, n-decenyl-9-amine, n-dodecenyl-9-amine, n-octadecadienyl-8-12-amine, n-hexadecadienyl-5-11-amine, 1-methyl-n-hexadecadienyl-5-11-amine, etc.

The following discussion is directed to an embodiment of the invention wherein acyclic and alicyclic hydrocarbons, such as normal hexane and methyl cyclopentane are isomerized in the presence of an aluminum chloride—hydrocarbon complex catalyst. This is not intended, however, in any limiting sense and the invention applies equally to other conventional processes employing metal halide catalysts.

The isomerization of normal hexane and methyl cyclopentane to isohexane and cyclohexane is carried out at a relatively low temperature in the range of about 90 and about 200° F. Preferably, the reaction is carried out under a pressure between about 140 and about 250 p.s.i.g., sufficient to maintain the reactant and the reaction effluent in the liquid phase. The degree of conversion and the type of products obtained depends upon several factors, including the concentration of aluminum chloride in the catalyst complex, the quantity of aluminum chloride employed relative to the hydrocarbon reactant, the concentration of hydrogen chloride in the reaction zone, and the contact or residence time of the reactant in the reaction zone. All of these conditions vary depending on the particular normal paraffin and cycloparaffin to be converted, however, generally it is desirable to maintain the quantity of aluminum chloride in the catalyst complex between about 50 and about 70 percent by weight, the hydrocarbon-to-catalyst ratio of between about 0.8:1 and 1.4:1, a hydrogen chloride concentration of between about 2 and about 6 weight percent based on the hydrocarbon feed and a contact or residence time in the reaction zone of between about 10 minutes and about one hour.

In carrying out the invention effluent from an isomerization reaction, such as, the isomerization or normal hexane to isohexane in the presence of an aluminum chloride-hydrocarbon complex catalyst, said effluent containing isohexane, unconverted normal hexane and catalyst complex, is passed to a settling zone wherein a preliminary separation of hydrocarbon and catalyst complex is effected. The catalyst phase is then treated with a coagulant, such as bentonite, whereby the catalyst is coagulated providing a further separation of catalyst and hydrocarbon. Separation of the coagulated catalyst is preferably accomplished by passing the bentonite treated catalyst phase through a filter containing sand, coal, bauxite or other inert filtering medium. The effluent from the filter comprising hydrocarbons and hydrogen chloride is then further treated for the separation and recovery of these materials, as desired. The quantity of coagulant employed, whether bentonite, alkyl amine or alkylene diamine, is usually between about 10 and about 1000 parts per million based on the catalyst phase to which the coagulant is added and preferably between about 30 and about 100 parts per million.

Inasmuch as the coagulated catalyst gradually builds up in the filtering zone, it is desirable to use a number of filters, preferably operated in parallel to provide continuous operation. It is also desirable, in order to provide more extended operation of the filters and prevent plugging thereof, to carry out periodic back washing through the filters utilizing, for example, effluent from the filters as back wash material. The back wash liquid can be passed to a settling zone for the removal of coagulated catalyst, after which, the liquid material can be combined with the feed to the filters.

Figure 2:
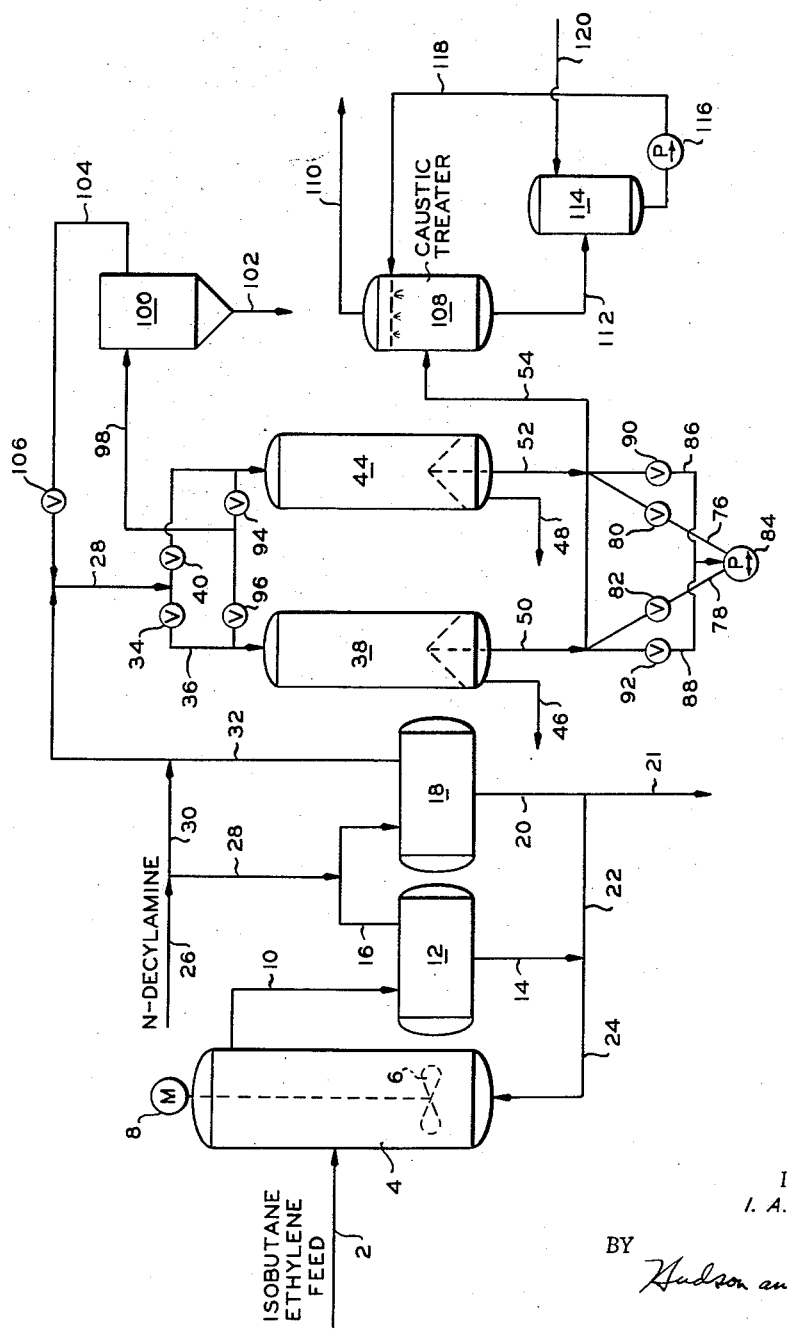

In order to more clearly describe the invention and provide a better understanding thereof, reference is had to the accompanying drawings, of which:

Figure 1 is a diagrammatic illustration of a process for the conversion of normal hexane to isohexane, and Figure 2 is a diagrammatic illustration of a process for the conversion of isobutane and ethylene to diisopropyl, both processes employing the coagulation method of this invention.

Referring to Figure 1, a mixture of normal hexane and methylcyclopentane saturated with aluminum chloride is introduced through conduit 2 to isomerization reactor 4. Also introduced to the reactor are recycle hydrogen chloride through conduit 74 and recycle aluminum chloride-hydrocarbon complex catalyst through conduit 24. The isomerization reactions are exothermic, therefore, the feed material is introduced at a temperature below the optimum temperature, namely about 120° F. which increases to a maximum of about 150° F. in the reactor. To maintain the catalyst dispersed throughout the reactor a stirrer 6 operated by a motor 8, is provided. In addition to the desired conversion products, namely isohexane from normal hexane and cyclohexane from methylcyclopentane, a number of other isomers are formed including dimethylbutanes, methyl pentanes, dimethylpentanes, etc. These products, in admixture with unreacted normal hexane and methylcyclopentane, leave the reactor through conduit 10 and pass through two settlers 12 and 18, which are arranged in series, wherein phase separation of hydrocarbons from the catalyst complex takes place. In the first settler 12 the catalyst complex, which forms the heavier phase, is withdrawn through 14 and recycled to the reactor through conduit 24. The hydrocarbon phase, which still contains a substantial amount of catalyst complex, is withdrawn and passed to the second settler 18 through conduit 16. The additional complex which separates in settler 18 is withdrawn therefrom through conduit 20 with a portion being recycled to the reactor through conduits 22 and 24 and the remainder being removed through conduit 21. The hydrocarbon phase in settler 18, still containing a minor amount of catalyst complex is removed therefrom through conduit 32 and introduced to one of filters 38 and 44.

For the purpose of coagulating the catalyst prior to the introduction of the reaction effluent to the filters, finely subdivided bentonite is added to this material through conduit 26. Provision is made to add the bentonite while the hydrocarbon effluent is in settler 18, namely through conduit 28, or after this material is removed from the settler, that is through conduit 30. After passing from the second settling zone the reactor effluent and coagulated catalyst are introduced to a bauxite filter, for example filter 38, through valve 34 and conduit 36. As the effluent passes through the bed of bauxite coagulated catalyst is separated. The amount of catalyst removal varies from about 85 to about 100 percent as compared to about 25 to 35 percent removal without the use of a coagulant. Effluent from the filter passes through raised outlet 50 and enters an accumulator 56 which serves as a feed tank for the hydrogen chloride stripper. Material from the feed tank is passed through conduit 58 and introduced to stripper 60. Heat is provided in the bottom of the stripper through reboiler 61 whereby hydrogen chloride is vaporized passing overhead from the stripper through conduit 64. This material is partially liquefied in condenser 66, passing to accumulator 68 with the condensate being returned to the stripper through pump 70 and conduit 72, as reflux, and the vapor portion being recycled through conduit 74 to reactor 4. The bottoms from the stripper, comprising hydrocarbon effluent substantially free from catalyst and hydrogen chloride, are removed through conduit 62 for further treatment, such as fractionation (not shown), to separate the various isomerization products and unreacted feed materials. Usually the unreacted feed components are recycled to the isomerization reactor.

As noted previously, a major portion of the coagulated catalyst separates from the hydrocarbon fraction of the reactor effluent during passage of this material through the bauxite filter 38. The major portion of the catalyst, however, remains in the filter as a deposit between and on the bauxite particles. Any material which settles in the bottom of the filter is removed through conduit 46. Eventually the amount of coagulated catalyst retained in the bauxite filter becomes sufficiently great to cause an excessive pressure drop. When this occurs, a cleansing of the bauxite filter and a reduction in the pressure drop can be obtained by back washing through the filter. Thus, when the pressure drop in filter 38 reaches a predetermined level, the filtering process is shifted to filter 44 and filter 38 is back washed, in this specific example with filtered effluent from filter 44. In carrying out the back washing operation said effluent is passed through conduit 52, valve 90 and conduit 86 into the suction of pump 84. From the pump the back wash material is discharged through conduit 78 and valve 82 and enters filter 38 through conduit 50. The wash material passes through this filter, removing in its passage coagulated catalyst from the filtering medium, and enters settler 100 by way of valve 96 and conduit 98. Sufficient residence time is provided in the settler to effect removal of coagulated catalyst which is discharged through conduit 102. The liquid in the settler is then removed through conduit 104 and valve 106, being combined with the feed to the filter 44.

The embodiment of the invention illustrated by the preceding discussion, while directed to a preferred method of carrying out the invention, is not intended to be restricted thereto and other methods of operation utilizing the various coagulants previously discussed and other process arrangements are also within the scope of the invention. Thus, for example, it is within the scope of the invention to employ a back wash material other than the filter effluent. For example, any of the hydrocarbons present in the reaction effluent can be employed without contaminating the product, or substantially increasing the processing equipment required for separation of the product into its various components.

It is also within the scope of the invention to treat the reaction effluent with the desired coagulant without a prior catalyst separation by settling or with the use of a single prior settling treatment. However, since it is desirable to reuse the major proportion of the catalyst entrained in the catalyst effluent, substantial catalyst recovery by settling prior to coagulation is preferred.

While filtering has been described particularly as the method for separating the coagulated catalyst from the hydrocarbon effluent, it is within the scope of the invention to effect the separation by other methods, such as centrifugation, decantation, etc.

Illustration of another embodiment of the invention is provided by Figure 2. In this application of the invention the feed material is a mixture of isobutane and ethylene, which is converted to diisopropyl. The method of treatment for the recovery of the catalyst complex in this embodiment of the invention is the same as that described in the discussion of Figure 1. In this instance, however, the coagulant employed is normal decylamine. In the diisopropyl process the amount of hydrogen chloride required in the reaction zone is much less than in the isomerization process. As a result, there is only a small amount of hydrogen chloride in the reaction effluent leaving the bauxite filters and this material is removed by caustic treating rather than by stripping as in the isomerization process. For this purpose the material leaving the bauxite filter is introduced through conduit 54 to a caustic treating vessel 108 wherein it is contacted with caustic introduced through conduit 118. The treated material, which is substantially free of catalyst complex and hydrogen chloride, is passed overhead from vessel 108 through conduit 110 for further treatment (not shown) as necessary to separate and recover the various materials contained therein. To facilitate the treating operation caustic is circulated through vessel 108 by means of conduit 112, caustic tank 114, pump 116 and conduit 118. As required make-up caustic can be introduced to vessel 114 through conduit 120.

The following data is presented in illustration of the invention in its various aspects.

EXAMPLE

Ethylene and isobutane were reacted in the presence of $AlCl_3$ to form diisopropyl, under the following reaction conditions:

| | |
|---|---|
| Olefin feed | 100,000 g.p.d. |
| Composition: | |
| Ethylene | 45.0 weight percent. |
| Methane | 16.0 weight percent. |
| Ethane | 14.0 weight percent. |
| Propylene | 16.5 weight percent. |
| Propane | 3.5 weight percent. |
| Water | 5.0 weight percent. |
| Fresh isobutane feed (95% iC$_4$) | 50,000 g.p.d. |
| Recycle isobutane feed (85% iC$_4$) | 300,000 g.p.d. |
| Olefin conversion | 90.0%. |
| Catalyst concentration | ⅓ of reactor volume. |
| Catalyst composition [1] | 55% $AlCl_3$. |
| Catalyst viscosity | 50–100 centistokes. |
| Catalyst heat of hydrolysis | 320/330 calories/gm. |
| Residence time | 39 sec. |
| Temperature | 130° F. |
| Pressure | 400 p.s.i.g. |

[1] Formed in reaction mixture from hydrocarbons present therein.

In each of the runs presented approximately 190 grams of the reaction effluent, after preliminary catalyst removal in a settling zone, was combined in a 350 cc. container with various quantities of di(normal decyl)-amine, normal decylamine or bentonite, the mixture was shaken for five minutes, allowed to set for five to ten minutes, filtered through filter paper and the filtrate analyzed for aluminum chloride content. Several control runs, without the coagulant additive utilizing filter paper, were also made. In these runs the removal of $AlCl_3$ varied from about 25 to about 35 percent.

Table

| Run No.[1] | Date | AlCl$_3$ Content, p.p.m. | | Percent AlCl$_3$ Removed | Additive [2] | Additive Concentration, p.p.m. |
|---|---|---|---|---|---|---|
| | | Inlet | Outlet | | | |
| 1 | 23 | 1,435 | 89 | 93.8 | A | 750 |
| 2 | 24 | 1,841 | 0 | 100.0 | A | 750 |
| 3 | 25 | 1,569 | 19 | 98.8 | A | 375 |
| 4 | 26 | 1,412 | 31 | 97.8 | A | 125 |
| 5 | 26 | 1,627 | 480 | 70.5 | A | 50 |
| 6 | 26 | 1,627 | 19 | 98.8 | B | 125 |
| 7 | 27 | 1,304 | 186 | 85.7 | B | 50 |
| 8 | 27 | 1,304 | 4 | 99.7 | C | 125 |
| 9 | 27 | 1,571 | 41 | 97.3 | C | 50 |
| 10 | 1 | 1,280 | 139 | 89.2 | C | 25 |
| 11 | 1 | 1,398 | 0 | 100.0 | C | 50 |
| 12 | 2 | 1,303 | 0 | 100 | A | 100 |
| 13 | 7 | 1,144 | 0 | 100.0 | B | 100 |
| 14 | 8 | 979 | 5 | 99.5 | C | 50 |
| 15 | 8 | 1,133 | 25 | 97.8 | B | 100 |
| 16 | 9 | 1,059 | 0 | 100.0 | A | 100 |
| 17 | 9 | 1,082 | 24 | 97.8 | C | 50 |

[1] Consecutive runs.
[2] A—di(normal decyl)amine; B—normal decylamine; C—bentonite.

It is to be noted that the use of additives A, B and C in the various quantities indicated gave almost complete separation of $AlCl_3$ from the reaction effluent.

Having thus described the invention by providing specific examples thereof, it is to be understood that no undue limitations or restrictions are to be drawn by reasons thereof and that many modifications and variations are within the scope of the invention.

I claim:

1. A process for separating a metal halide-hydrocarbon complex catalyst from a hydrocarbon reaction effluent which comprises mixing said effluent with bentonite, whereby the catalyst is coagulated, passing reaction effluent containing coagulated catalyst through a filter zone containing an inert solid filtering medium wherein coagulated catalyst is removed, periodically backwashing said filter zone with filtrate to remove coagulated catalyst from the filtering medium, passing the wash filtrate containing coagulated catalyst to a settling zone and combining filtrate from said settling zone with reaction effluent entering the filter zone.

2. A process for separating aluminum chloride-hydrocarbon complex catalyst from a hydrocarbon reaction effluent which comprises mixing said effluent with bentonite, whereby the catalyst is coagulated, passing reaction effluent containing coagulated catalyst through a filter zone containing an inert solid filtering medium wherein coagulated catalyst is removed, periodically backwashing said filter zone with filtrate to remove coagulated catalyst from the filtering medium, passing wash filtrate containing coagulated catalyst to a settling zone and combining filtrate from said settling zone with reaction effluent entering the filter zone.

3. The process of claim 2 in which the filter medium is bauxite.

4. A process for separating aluminum chloride-hydrocarbon complex catalyst from the product of the reaction of ethylene and isobutane to diisopropyl which comprises mixing said reaction product with bentonite, whereby the catalyst is coagulated, passing reaction effluent containing coagulated catalyst through a filter zone containing an inert solid filtering medium wherein coagulated catalyst is removed, periodically backwashing said filter zone with filtrate to remove coagulated catalyst from the filtering medium, passing the wash filtrate containing coagulated catalyst to a settling zone and combining filtrate from said settling zone with reaction effluent entering the filter zone.

5. The process for separating aluminum chloride-hydrocarbon complex catalyst from the product formed by the isomerization of normal hexane and methylcyclopentane which comprises mixing said reaction product with bentonite, whereby the catalyst is coagulated, passing reaction effluent containing coagulated catalyst through a filter zone containing an inert solid filtering medium wherein coagulated catalyst is removed, periodically backwashing said filter zone with filtrate to remove coagulated catalyst from the filtering medium, passing the wash filtrate containing coagulated catalyst to a settling zone and combining filtrate from said settling zone with reaction effluent entering the filter zone.

References Cited in the file of this patent

UNITED STATES PATENTS

| | | |
|---|---|---|
| 2,106,071 | Stanton | Jan. 18, 1938 |
| 2,368,596 | Johnston et al. | Jan. 30, 1945 |
| 2,402,817 | Iverson | June 25, 1946 |
| 2,476,750 | Matuszak | July 19, 1949 |
| 2,754,344 | Weatherly | July 10, 1956 |